US006976019B2

(12) United States Patent
Davallou

(10) Patent No.: US 6,976,019 B2
(45) Date of Patent: Dec. 13, 2005

(54) PHONETIC SELF-IMPROVING SEARCH ENGINE

(76) Inventor: Arash M Davallou, 17032 Burbank Blvd., #3, Encino, CA (US) 91316

( * ) Notice: Subject to any disclaimer, the term of this patent is extended or adjusted under 35 U.S.C. 154(b) by 440 days.

(21) Appl. No.: 10/126,320

(22) Filed: Apr. 19, 2002

(65) Prior Publication Data

US 2002/0156776 A1 Oct. 24, 2002

Related U.S. Application Data

(60) Provisional application No. 60/285,083, filed on Apr. 20, 2001.

(51) Int. Cl.[7] .......................... G06F 17/30; G10L 15/00
(52) U.S. Cl. ............................................ 707/6; 704/238
(58) Field of Search ....................... 707/3–6; 704/254, 704/238–240; 342/357.09; 379/93.25

(56) References Cited

U.S. PATENT DOCUMENTS

| 5,832,428 | A | * | 11/1998 | Chow et al. ................. 704/254 |
| 6,144,336 | A | * | 11/2000 | Preston et al. .......... 342/357.09 |
| 6,144,958 | A | | 11/2000 | Ortega et al. ................... 707/5 |
| 6,311,182 | B1 | | 10/2001 | Colbath et al. ................. 707/6 |
| 6,363,380 | B1 | * | 3/2002 | Dimitrova ....................... 707/6 |
| 6,731,735 | B1 | * | 5/2004 | Cook ..................... 379/207.11 |

OTHER PUBLICATIONS

"Phonetic String Matching: Lessons from Information Retrieval" Zobel, Justin and Dart, Philip (1996) Melbourne, Australia.

"Handling Spelling Errors in Online Catalog Searches" Drabenstott, Karen M. and Weller, Marjorie S. (1996) Melbourne, Australia.

"Applications of Approximate Word Matching in Information Retrieval" French and Powell, Schutman (1997) Charlottesville, Virginia.

* cited by examiner

*Primary Examiner*—Uyen Le
*Assistant Examiner*—Susan Y. Chen

(57) ABSTRACT

The present invention relates to phonetic self-improving search engines. The search engine may include a phonetic database having a plurality of phonetic equivalent formulas stored therein, each of the phonetic equivalent formulas being associated with at least one respective pronounceable unit. After an initial query in a primary database fails to produce a positive result, an error memory database may be queried with a search string to obtain a positive result based on records of previously failed searches which ultimately found a positive result. If no record is found, the search string may be parsed into at least one pronounceable unit. Phonetically equivalent formulas may be applied to the at least one pronounceable unit to create at least one phonetic search string which is re-queried into the error memory database and the primary database. Successful positive results may be stored with the search string in the error memory database.

21 Claims, 5 Drawing Sheets

PHONETIC SELF-IMPROVING SEARCH ENGINE

CROSS-REFERENCE TO RELATED APPLICATIONS

This application claims the benefit of U.S. Provisional Application No. 60/285,083 entitled "PHONETIC SELF-IMPROVING SEARCH ENGINE" filed Apr. 20, 2001, the entirety of the disclosure of which is expressly incorporated herein by reference.

STATEMENT RE: FEDERALLY SPONSORED RESEARCH/DEVELOPMENT (Not Applicable)

BACKGROUND OF THE INVENTION

The present invention generally relates to the field of search engines and more particularly to self-improving phonetic search engines for use in databases, web browsers and the like.

Conventional search engines (or browsers) that perform searches on the web, whether they be search engines within a company website helping clients look for products and services, database searches within call centers, or general search engines for the world wide web (Internet), generally perform the search task using a text matching process. Users enter keywords within designated search fields and the text matching process begins.

This process is generally not the most accurate or convenient way to search for data, partially because the user may make spelling mistakes while typing in the search field, or s/he may not know the precise spelling of a proper noun that may have various different spelling formats (i.e. "Fich" and "Fish" both pronounced "Fish" or "Jo" and "Joe"). This results in frustration as the user may not be referred to the site/information that s/he intended and s/he must then restart the search attempting a different spelling or set of words.

As an illustrative example, typically in website searching, the user may enter a search string which is then compared with the database of registered URLs. If an accurate match is found, the user is directed to the respective website associated with the registered URL. If no accurate match is found, the web-browser typically returns an error message indicating that no match has been found, whereby the user must then reenter a different search string by experimenting with various spelling combinations.

Phonetic string matching has been developed in the past to address the problem of spelling in search queries. However, current systems codify both the primary database and the search string to attempt to match the two when the text-based search does not reveal any results. The problem with this approach is that it assumes the primary database to not change constantly, and if changed, to do so with aid of a coding agent that would include application specific phonetic tags onto primary records to be used for future queries within a closed database system. When the primary database becomes as large and open as the world wide web with constantly changing data and no universal application to tag all primary records for an application-specific phonetic matching process, then there arises a need to address potential misspellings in search queries in a more efficient manner.

Some technologies have recently been introduced that utilize matched and un-matched terms within a search string that consists of more than one word to correct the spelling of the un-matched term and help direct a user automatically to what s/he may have been looking for (please see referenced U.S. Pat. No. 6,144,958). However, these technologies are not helpful when the un-matched term is only one word.

Accordingly, there is a need for improving the current methodologies employed in search engines.

BRIEF SUMMARY OF THE INVENTION

The current invention complements previous technological developments in this field and helps to alleviate the problem of misspelled queries to databases (especially open databases with constantly changing data such as the world wide web) by creating synthetic lexicon based on the estimated phonetic nature of the typed text within a search field and using that synthetic lexicon to look for matches in the primary database without any codification of the primary records in the database. Additionally, it harnesses the fact that people may be prone to make similar mistakes through time to help improve the efficiency and accuracy of the search engine via its novel phonetic error memory database system.

In accordance with the present invention, there is provided a method of providing a user with a positive search result by querying a database system. The method includes creating a phonetic database having a plurality of phonetically equivalent formulas stored therein. Each of the phonetically equivalent formulas being associated with at least one respective pronounceable unit. The method further includes receiving a search string from a user. A primary database is queried with the search string. The primary database has a plurality of primary records stored therein. If the search string exists in the primary database, the method proceeds to identify the primary record matched in the primary database as the positive search result. If the search string does not exist in the primary database, the method proceeds to query an error memory database with the search string. The error memory database has a plurality of error memory records. Each of the error memory records has at least one positive search result and at least one search string associated therewith. If the search string exists in the error memory database, the method proceeds to identify the positive search result which matches the search string. But if the search string does not exist in the error memory database, the phonetic search engine is initialized. Optionally, the error memory record having the search string and the associated positive search result stored therein is checked to determine if it is still valid. In the context of website addresses, the validity of the URL address may be checked. If the positive search result is invalid, the invalid error memory record is removed from the error memory database so as to prevent future users from encountering incorrect results.

The present invention provides a method of providing users with positive search results by querying a database system. The method proceeds to parse the search string into at least one pronounceable unit. The phonetically equivalent formulas are applied to the at least one pronounceable unit for outputting at least one phonetic search string. Optionally, all possible phonetic search strings generated by the parsing are stored. Further, the at least one phonetic search string is compared with the primary records and the error memory records. If the at least one phonetic search string exists in the primary database, then the method proceeds to identify at least one result candidate as the positive search result. If the at least one phonetic search string exists in the error memory database, the method proceeds to identify at least one result candidate as the positive search result. If the positive search result is confirmed by the user, then the original misspelled search string, the phonetic search string, and the positive search result associated therewith, is stored as an error memory record in the error memory database. All the phonetic search strings generated by the parsing are tested to ensure identification of a positive search result. Upon determining that none of the phonetic search strings generated by the system exist, the user will receive a message indicating that no positive search result was found.

It is therefore an object of the present invention to provide a novel method of providing a user with a positive search result by querying a database system.

It is also an object of the present invention to provide a novel method of providing a search result by continually improving the database system's ability to return the most likely and/or accurate matches for the desired search strings by continually updating the error memory database.

It is further an object of the present invention to provide a novel method of providing a search result by continually deleting invalid information from the database by checking the validity of such information during the searching process or independent of the search process.

BRIEF DESCRIPTION OF THE DRAWINGS

These as well as other features of the present invention will become more apparent upon reference to the drawings wherein.

DETAILED DESCRIPTION OF THE INVENTION

The detailed description, as set forth below in connection with the appended drawings, is intended as a description of the presently preferred embodiments of the invention, and is not intended to represent the only form in which the present invention may be constructed or utilized.

Figure 1:
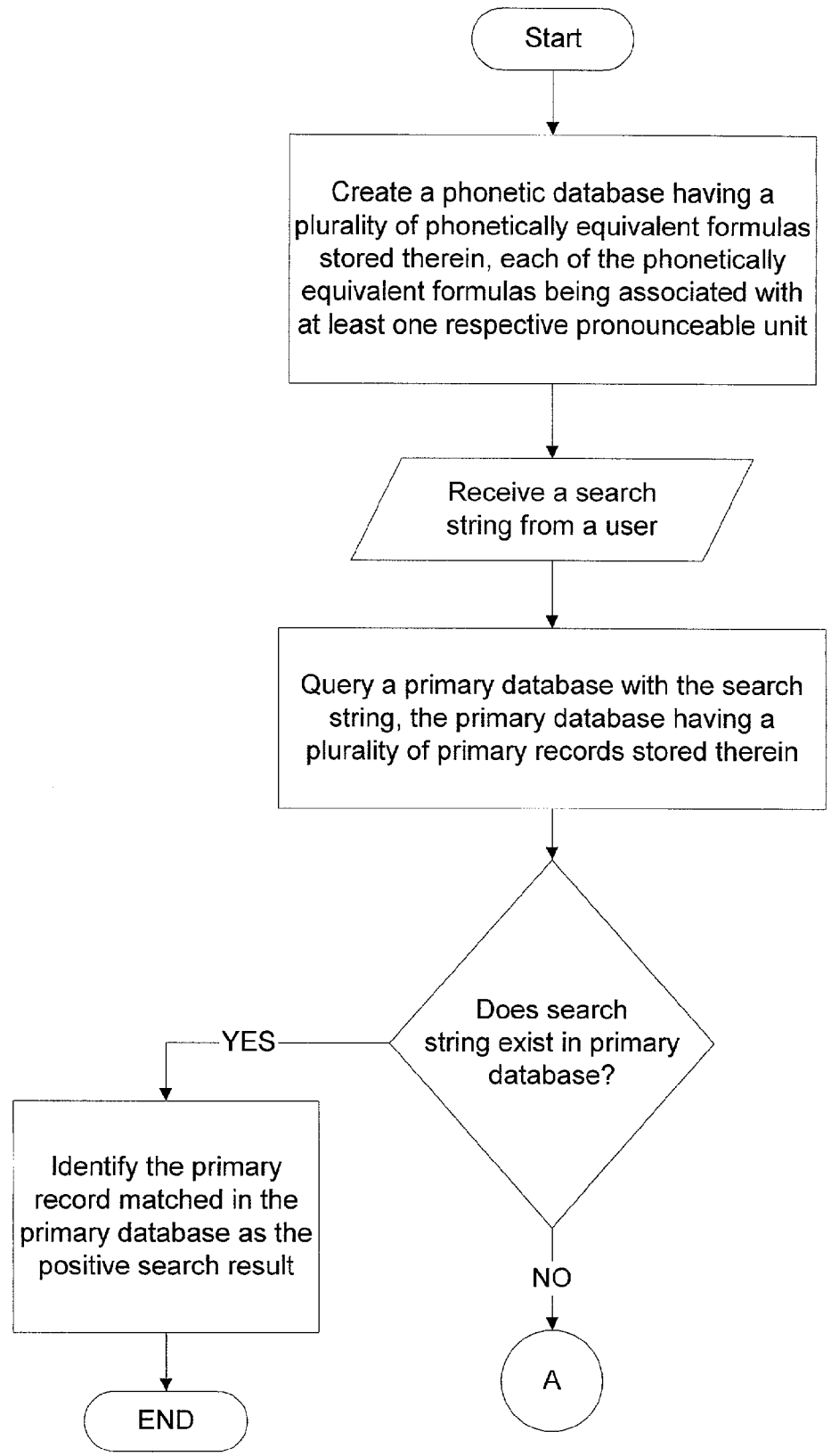
FIGS. 1–5 are flow chart diagrams illustrating the method according to the present invention.
Figure 2:
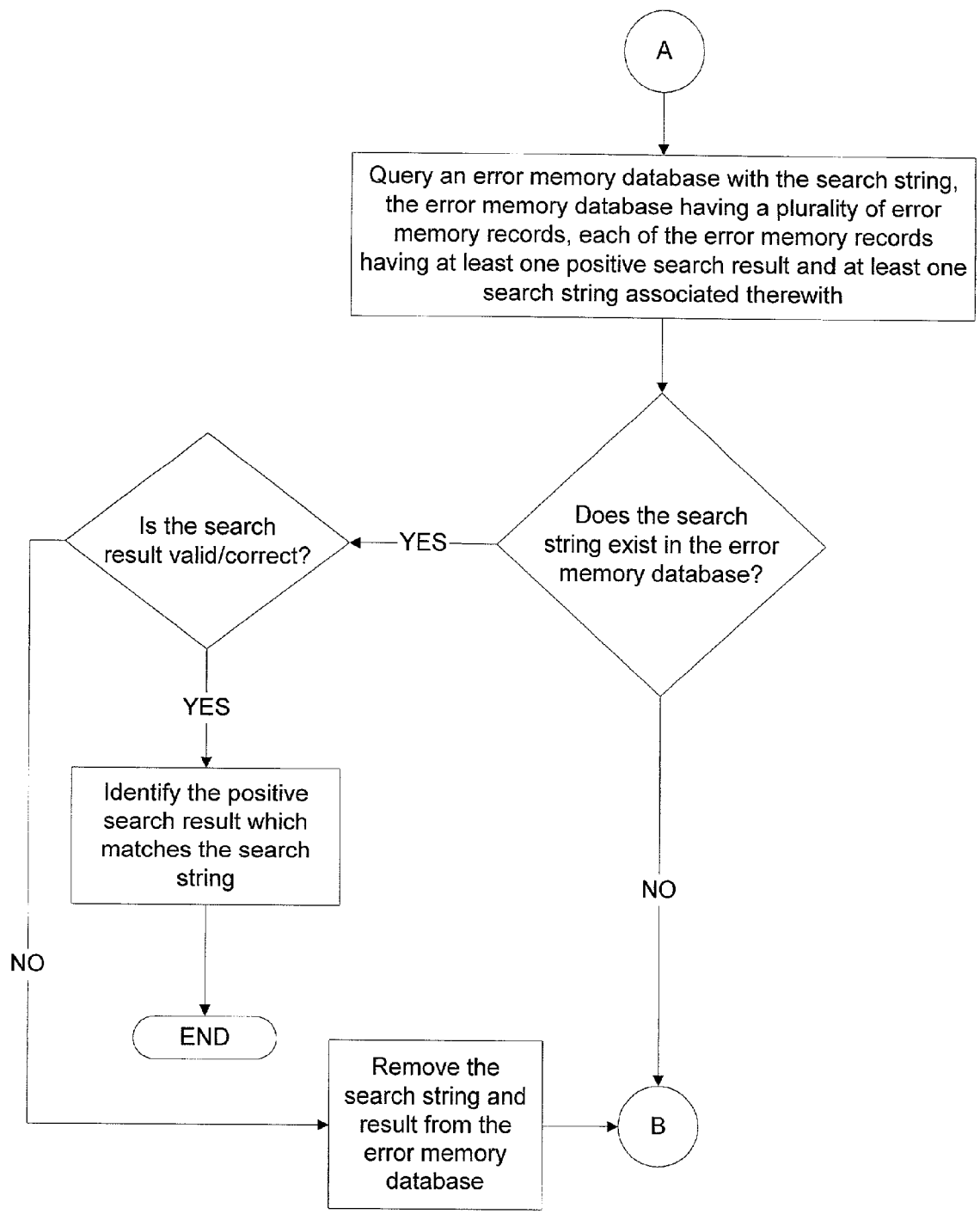
Figure 3:
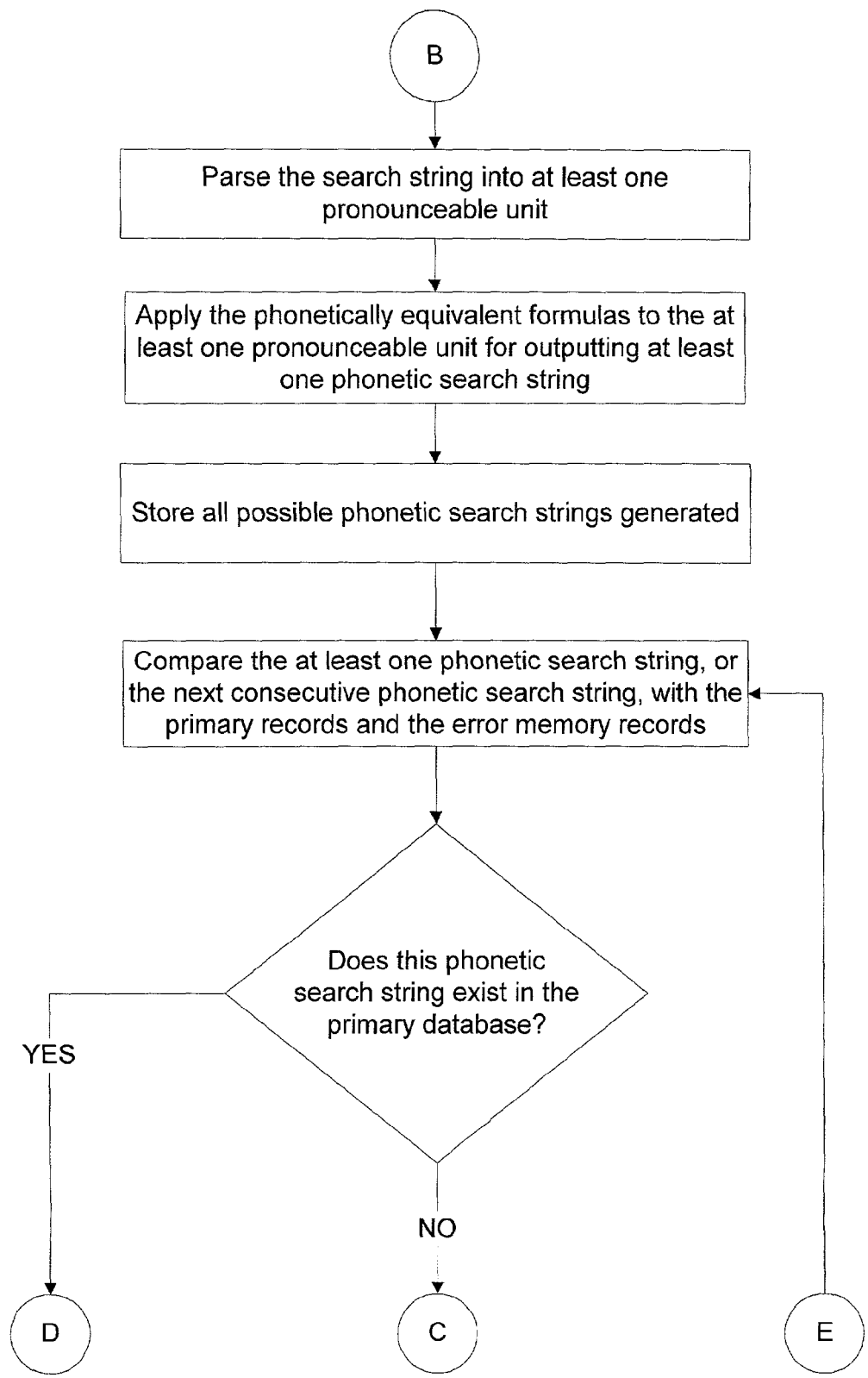
Figure 4:
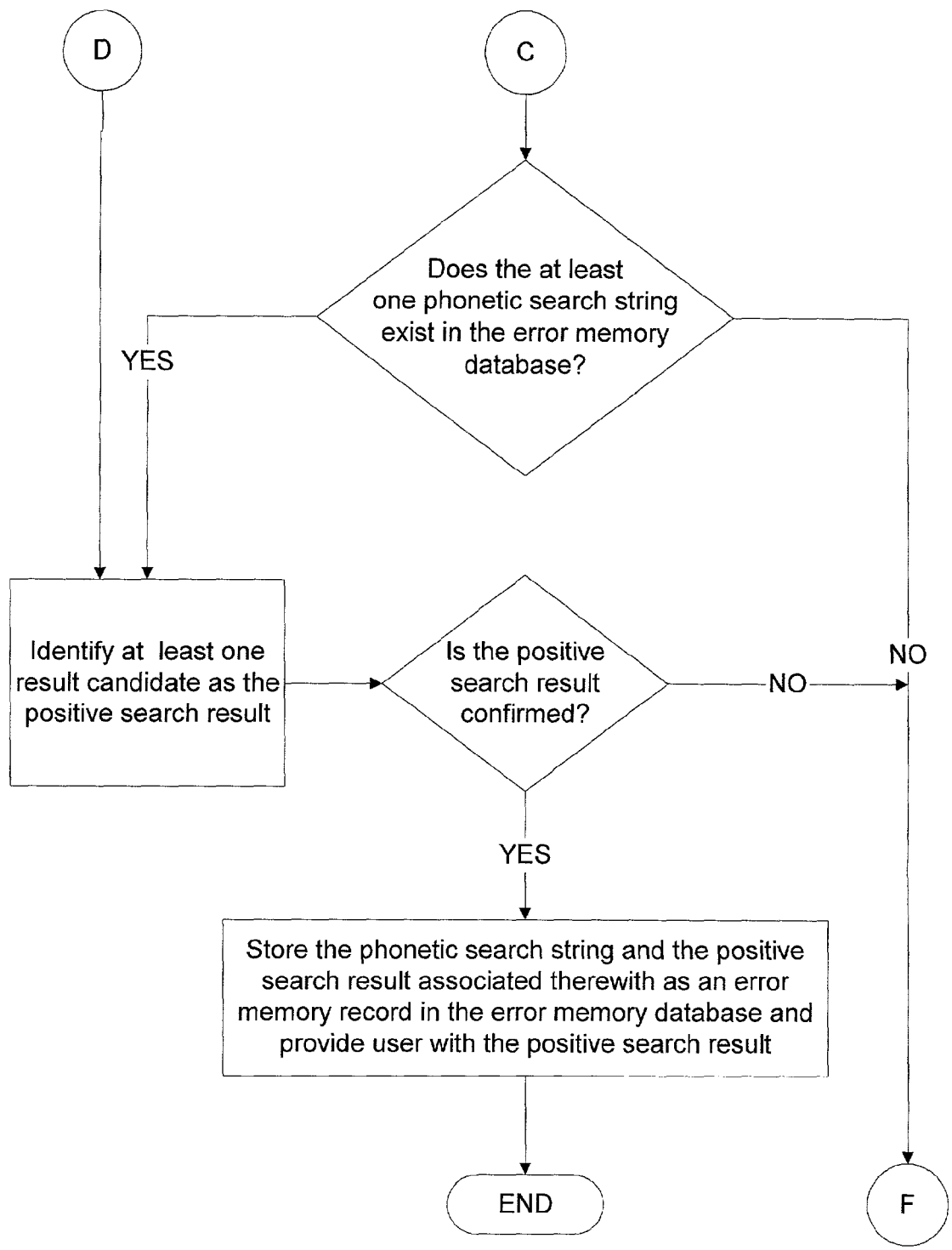
Figure 5:
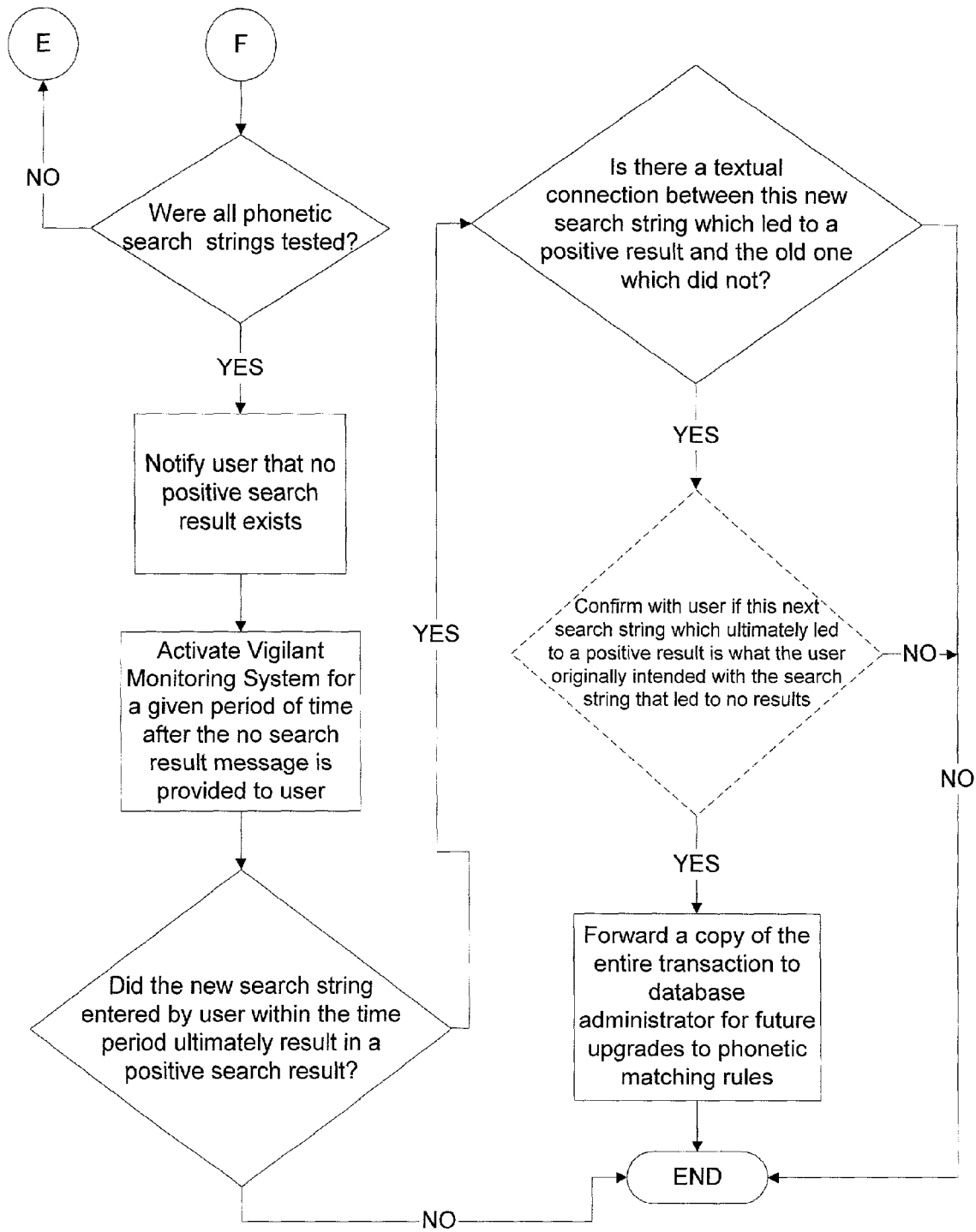

Referring now to the drawings wherein the showings are for the purposes of illustrating preferred embodiments of the present invention only, and not for the purposes of limiting the same, FIGS. 1–5 illustrate the method of providing a user with a positive search result by querying a database system.

In accordance with the present invention, the self-improving phonetic search engine invention is a software/engine which may be integrated with current search engine software or can be bundled with its own text-based search software. This software uses a novel search method which alleviates the problem of misspelled text (especially proper nouns) by performing a phonetic-based search in addition to the traditional text-based search to increase the accuracy of the result. In this respect, if a user is looking for a particular keyword/web site, and the keyword/s s/he enters does/do not match any data existent on the database/web, the engine would perform a second search with words that best match the sounds of the typed word/s in the user's language (or various languages) to see if a more accurate match can be found in the database/web. This system helps the user to more accurately pinpoint the data that s/he may be looking for without the need to retype the search request various times with alternate spellings. For proper nouns it alleviates the problem of having to retype the information with different spellings, and for normal words, if not spelled correctly, it can assist in pin pointing the information requested utilizing a correct spelling associated with the sound of the word entered.

One exemplary methodology is as follows. The keyword/s that is/are entered, first goes/go through a text-matching search process for the fastest match in a primary database. If an accurate match is found, the matching text is identified and communicated to the user. If an accurate match containing the word/s is not found, then a query may be performed in an error memory database. The error memory database contains a plurality of error memory records which contain data of previous searches where at least one positive search result was found in association with at least one search string. Thus the error memory database stores a history of prior erroneous/misspelled queries and their corresponding correctly spelled search strings leading to results. Advantageously, by providing such an error memory database, the future entry of the same search string with an incorrect spelling would be found and the user will be provided with a result more expeditiously. In this respect the search engine is self-improving. The error memory database may communicate to the user that the previous user who entered that particular search string found a positive result with: (and present the correctly spelled string) or simply present the correctly spelled string and ask the user if that is what s/he meant to enter in the search field. Hence, this system leverages mistakes made by previous users to help expedite the searching activities of future users.

If, however, the error memory database were to have no record of the search string entered by the user, the phonetic based search begins which would simultaneously compare and contrast words and sounds of what was entered as the search string and that which exists on the web/database. Such phonetic searching may be accomplished by initially providing a phonetic database which contains a set of phonetically equivalent formulas. In this respect, the phonetically equivalent formulas equate commonly mispronounced pronounceable units, including vowels, consonants, and other letter combinations, with pronounceable units. By way of example, one phonetically equivalent formula may be: "B=V" or another formula may be "OO=OU". A plurality of these formulas may be pre-entered into a phonetic database to be utilized by the present invention during the search process. Alternatively, the formulas may be retrieved from another database source. It is not crucial that the phonetic database reside on the same system/server as the database system, however the phonetic database may be a dataset which is a relational dataset linked to the database system.

Furthermore, where multiple potential result candidates are displayed or communicated to the user, they are preferably communicated in an array. To facilitate a more simplistic way of sorting through the data array, such an array may be sorted alphabetically or in order of relevance. Optionally, the array may be selectably adjustable by a variable accuracy factor. The accuracy factor may or may not be available to change by the end-user, however, it can be controlled by the administrator of the search engine and the phonetic search may follow the text search or work in unison with it. The term "accuracy factor" here refers to how closely the search results resemble the original query. 100% accuracy is when all of the texts found match precisely the text entered in the order in which the text was entered. Less accurate results provide only partial matches or matches for the same text but in a different order. Additionally, the accuracy factor may rely upon the database system's previous search history and records of positive results found by previous users. In this respect, such positive results would be listed first where the accuracy factor is increased.

To better illustrate the functionality of the present invention, an example is provided below. If the search string desired by the user is "Fich and Richardson Flower Shop," there are numerous interpretations to such a phrase. If one were to hear the phrase from a friend and enter "Fish and Richardson Flower Shop" on any of numerous Internet search engines, the results might not match the actual site. Unfortunately, the user must then retype the search string entered and try again by using a different combination of words/spellings. The present invention could recognize the lack of accuracy and perform a phonetic search based on the sounds of the words entered and through that system pinpoint the correct web address. In this case, after recognizing an inaccurate match for the words typed, the system will analyze each word entered and search for similar sounding words within the phonetic database and generate a number of different combinations based on the approximate pronunciation of the text entered and the phonetically equivalent formulas. This engine considers all possible combinations of matches until the highest degree of accuracy is achieved for the query. For example, if the phonetically equivalent rule "CH=SH" were applied, at least one phonetic search string would result. Some examples of such phonetic search strings include: "Fish and Rishardson Flower Chop," "Fich and Rishardson Flower Shop," etc. This novel system may eventually find the "Fich and Richardson Flower Shop" even though the original entry involved a different spelling, without the user having to respell or retype the entry.

This novel system can also be used for 411 information call centers. For example, if a user wished to obtain the information for the surname "Davallou," the user might contact 411 and vocally or otherwise audibly communicate the surname over the phone to the operator. This surname is sometimes misheard over the phone as "Baballoo", which does not retrieve any information. As the letters D, V and B may sound the same over the phone, this is an issue and callers are forced to spell the name wanted letter by letter, and sometimes the spelling may not be correct as they may have simply heard the name from a friend. The presented invention will compare and contrast what has been entered to a phonetic database and facilitate the search process by matching the closest sounding word to that which was entered. In this respect, when "Baballoo" is entered, the system recognizing that the letters B, D and V may have been misheard via the phonetically equivalent formulas or other means of recognizing commonly misspelled pronounceable units, will perform a comprehensive search for all other possibilities before stating "no match found." This would include in this case a change in the last part of the word entered to "ou" from "oo" to account for the possible similarity in sound. This process facilitates the search process and saves time for both the operator and the client. The aforementioned example is only one of many possible examples. There are many other letters and letter combinations, or pronounceable units, which may sound alike which this novel system recognizes.

Another scenario in which this may become useful would be within the context of a web browser. Contemporary web browsers incorporate technology where when a user enters a website URL (Uniform Resource Locator) that does not exist, the user receives an error from the system indicating that no such URL exists. This is because typically, the URL address must be exact to retrieve the proper website address. However, this novel system can direct users to the most similar sounding website URL addresses which actually exist and provide users with the ability to choose among them rather than encounter an error which requires the user to make further attempts by retyping the URL address. This novel process of phonetic based searching is designed to make search engines or web browsers more sensitive to human error and to enhance their accuracy through time.

To improve the searchability of Internet Websites, the present invention further provides a method of directing a user to an Internet Website address. This method is substantially the same as described herein with reference to general databases yet additionally directs the user to the specific Internet Website address. The method includes creating a phonetic database having a plurality of phonetically equivalent formulas being associated with at least one respective pronounceable unit. Next, a search string may be received from the user. Subsequently, a registered URL database may be queried with the search string. As used herein, registered URL database refers to Internet databases storing locations and data for directing web surfers to the proper Internet Website. More specifically, text-based Internet Website addresses and their respective IP address are stored in at least one database accessible on the Internet. Each IP address should correspond to the location of a respective server storing web-page data. Preferably, the primary record database is the registered URL database. However, the registered URL database shall include other databases including global computer network address information accessible from the global computer network by users for locating specific data pages, i.e. Internet Websites. If the registered URL database includes a URL record matching the search string, the matching URL record is identified as the Internet Website address to the user. Preferably, the user is then directed to the Internet Website address. If, however, the search string is not found in the registered URL database, the method proceeds to query a URL error memory database with the search string. As used herein, the URL error memory database is substantially the same as the error memory database described herein yet is specifically oriented to store URL-specific error memory data. The URL error memory database includes a plurality of URL error memory records and each of these URL error memory records has at least one Internet Website address and at least one search string associated therewith. If the search string does exist in the URL error memory database, a respective one of the URL error memory records matching the search string is identified as the Internet Website address. The user is then either suggested the Internet Website address as an alternative to what they typed, or is directed to it and notified that the original search string led to no results and that this new website is the closest match.

As a final step, if the search string does not exist in the URL error memory database, the phonetic searching process commences. Preferably, the search string is parsed into at least one pronounceable unit, as previously described herein. Phonetically equivalent formulas, whether predetermined or created by the system, may be applied to the at least one pronounceable unit for outputting at least one phonetic search string. These phonetic search string(s) are compared with the URL records and the URL error memory records. If it is determined that the phonetic search string(s) exists in the registered URL database, at least one result candidate which matches the phonetic search string(s) is identified as the Internet Website address. Similarly, if the at least one phonetic search string exists in the URL error memory database, at least one result candidate which matches the at least one phonetic search string is identified as the Internet Website address. The Internet Website address may then be confirmed by the user. If such confirmation is determined, whether manually or automatically via monitoring of user behavior, a confirmed phonetic search string is defined. The search string, the confirmed phonetic search string and the Internet Website address are stored in the URL error memory database as an URL error memory record.

Because this invention involves improving the searchability of data within enterprise databases or the world wide web and making it more accommodating to human error, there is provided a system that remembers prior errors and builds an error memory database to improve searchability of data for future users, in case the same error is made as previous users. For example, with the surname and search string "Davallou," if a user misspells the name when initially entering the search string and enters, "Baballoo," the system will first do a search to see if "Baballoo" exists in the primary database. If "Baballoo" does not exist in the primary database or the error memory database, then the phonetic engine begins making alternate synthetic words that sound the same and tests them within the primary database, and "Davallou" may be presented to the end user as the closest match. After the user has had a chance to explore "Davallou," the system will confirm the error memory link between "Baballoo" and "Davallou" by either asking the user if "Davallou" was the correct match, or implying this by monitoring user behavior. The next time around that a user makes the same mistake of typing "Baballoo" and such a string does not result in matches in the primary database, then the error memory link associating "Baballoo" and "Davallou" will be confirmed by testing to see if "Davallou" is still a valid string with a valid result in the primary database, and then "Davallou" is presented to the end user as a suggested match for what the user may have been looking for. This way a phonetic search process may not have to be conducted when the same spelling error is repeated in the future.

The user affirmation of a phonetic search string's validity can be ascertained by having the user click on a button that asks if this was the correct match for the data that they entered, or the system can monitor the user's behavior to the data presented to reach that conclusion. For example if a user clicks on "Davallou" and remains on the website for a designated period of time or clicks through the site to explore the site that "Davallou" was found on, then this may imply a positive correlation and the system will record a confirmation in the error memory database. In this respect, the system fine-tunes itself to the most common human errors through time and is able to deliver the fastest access to the content that a user is looking for without the user having to reenter the spelling of the search string.

Inaccurate search results or text that generated no results preferably goes through the following process. The primary database is queried with the search string to determine if an exact match exists. If no match exists, the search string is compared with the error memory database to determine if such a search string has been queried before. If the error memory database ascertains that it has been queried before by another user, the previously affirmed match is verified to determine if it is still valid on the system. If the data is still valid than that data/site is suggested as a possible match for what the new user is looking for. The user at this point may choose to accept the result or ask to conduct a more through phonetic search. If the error memory database affirms that this is a novel query, then the phonetic search process is initiated.

Text-to-sound estimation for each word entered may be conducted (this can and sometimes may involve the use of a text-to-speech and/or speech-to-text application, i.e. voice recognition applications which include computer software which receives audible signals and converts such signals into text). In this respect, possible different spellings for each word entered are generated as a result by parsing the search term into pronounceable units and applying the phonetically equivalent formulas to create at least one phonetic search string. All possible spelling combinations of each word entered are matched with all spelling combinations of other words entered and all possibilities are checked against the database of existing data/the world wide web (the primary database) and the error memory database. The most accurate matches may be presented to the user in order of accuracy. The data that the user ascertains to be a good match for the original text entered is recorded as an error memory record in the error memory database for future reference. The ascertainment of a positive result can be literal, whereby the user is prompted to answer if the suggested data matched their original intentions or the system can decipher that based on the user's behavior and his/her interaction with the data retrieved. Optionally, the user may be prompted with a query as to whether the phonetic search string is the correct match. If the user indicates that there is an incorrect match, then the link between that phonetic string and the original query may be deleted from the error memory database.

Additionally, further improvements may be made which enhance the functionality of the novel method according to the present invention. Optionally, a Vigilant Monitoring System that seamlessly monitors what users retype after not receiving any accurate responses to their original query may be provided. Based on what users retype and the results they get from that modified entry and how much time they spend on the results (or their positive response to a question asking if what they are currently looking at is what they intended to look for based on their original query which led to no results), new phonetically equivalent formulas may be developed within the system to make it more refined and better equipped to deal with common human errors in the future. In this respect, if no positive search result is found to exist after exhausting all possibilities of phonetic search strings, the Vigilant Monitoring System may be activated for a given period of time. If the next search string entered by the user within the time period ultimately results in a positive search result, it is then determined whether there is a textual correlation between this new inquiry which led to a result and the old one which did not. A textual correlation is determined utilizing the accuracy factor. Optionally, the user may be queried to confirm if the next search string which ultimately led to a result is what the user originally intended with the string that led to no results. Finally, a copy of the entire transaction is forwarded to a database administrator for future upgrades to phonetic matching rules. Optionally, the system may create its own phonetic formulas based on the phonetic link identified by comparing the new inquiry and the initial inquiry.

Additionally, a common dictionary-based spell check system may be employed and integrated within the system to further add a layer of accuracy to the results suggested and delivered to the end-user based on the end-user's language of preference. This may facilitate accurate suggestions made when the lack of search results is not due to misspellings of proper nouns (with various possible spellings), but rather due to misspellings of regular words within a language's given dictionary. Such a spell check system may be provided as an initial step in the novel method of the present invention.

Additional modifications and improvements of the present invention may also be apparent to those of ordinary skill in the art. Thus, the particular combination of parts described and illustrated herein is not intended to serve as limitations of alternative devices within the spirit and scope of the invention.

What is claimed is:

1. A method of providing a user with a positive search result by querying a database system, the method comprising the steps of:
   (A) creating a phonetic database having a plurality of phonetically equivalent formulas stored therein, each of the phonetically equivalent formulas being associated with at least one respective pronounceable unit;
   (B) receiving a search string from the user;
   (C) querying a primary database with the search string, the primary database having a plurality of primary records stored therein;
   (D) if the search string exists in the primary database:
      (1) identifying a respective one of the primary records which matches the search string in the primary database as the positive search result; and
   (E) if the search string does not exist in the primary database:
      (1) querying an error memory database with the search string, the error memory database having a plurality of error memory records, each of the error memory records having at least one positive search result and at least one search string associated therewith;
      (2) if the search string exists in the error memory database:
         (a) identifying a respective one of the error memory records which matches the search string in the error memory database as the positive search result; and
      (3) if the search string does not exist in the error memory database:
         (a) parsing the search string into at least one pronounceable unit;
         (b) applying the phonetically equivalent formulas to the at least one pronounceable unit for outputting at least one phonetic search string;
         (c) comparing the at least one phonetic search string with the primary records and the error memory records;
         (d) if the at least one phonetic search string exists in the primary database:
            (i) identifying at least one result candidate which matches the at least one phonetic search string in the primary database as the positive search result;
         (e) if the at least one phonetic search string exists in the error memory database:
            (i) identifying at least one result candidate which matches the at least one phonetic search string in the error memory database as the positive search result; and
         (f) if the positive search result is confirmed by the user:
            (i) storing the search string, a confirmed phonetic search string and the positive search result in the error memory database as an error memory record.

2. The method as in claim 1 wherein a plurality of result candidates are identified as the positive search result in an array, the array being selectably adjustable by a variable accuracy factor.

3. The method as in claim 1 wherein step (E) (2) further comprises the steps of:
   (b) verifying the positive result identified in the error memory database for validity;
   (c) if the positive result is invalid:
      (i) deleting the error memory record associating the positive search result with the respective search string from the error memory database; and
   (d) if the positive result is valid:
      (i) outputting the positive search result to the user.

4. The method as in claim 3 wherein step (E) (2) further comprises the steps of:
   (e) requesting a confirmation from the user that the positive search result outputted to the user is correct; and
   (f) if the positive search result outputted to the user is correct:
      (i) storing the confirmation in a respective error memory record.

5. The method as in claim 3 wherein step (E) (2) further comprises the steps of:
   (e) tracking the user's activity in the database system to automatically create a confirmation of the positive search result without user confirmation; and
   (f) storing the confirmation in a respective error memory record.

6. The method as in claim 5 wherein step (E) (2) further comprises the step of:
   (i) recording duration of time the user spends viewing the positive search result.

7. The method as in claim 1 wherein step (E) (3) (d) further comprises the steps of:
   (ii) verifying the at least one result candidate identified for validity; and
   (iii) if the at least one result candidate is invalid:
      (A) deleting the primary record associating the positive search result with the respective phonetic search string from the primary database; and
   (iv) if the at least one result candidate is valid:
      (A) outputting the positive search result to the user.

8. The method as in claim 7 wherein step (E) (3) (d) further comprises the steps of:
   (v) requesting a confirmation from the user that the positive search result outputted to the user is correct.

9. The method as in claim 7 wherein step (E) (3) (d) further comprises the steps of:
   (v) tracking the user's activity in the database system to automatically create a confirmation of the positive search result without user interaction; and
   (vi) storing the confirmation in the respective primary record.

10. The method as in claim 7 wherein step (E) (3) (d) further comprises the step of:
    (A) recording duration of time the user spends viewing the positive search result.

11. The method as in claim 1 wherein step (E) (3) (e) further comprises the steps of:
    (ii) verifying the at least one result candidate identified for validity;
    (iii) if the at least one result candidate is invalid:
       (A) deleting the error memory record associating the positive search result with the respective phonetic search string from the error memory database; and
    (iv) if the at least one result candidate is valid:
       (A) outputting the positive search result to the user.

12. The method as in claim 11 wherein step (E) (3) (e) further comprises the steps of:

(v) requesting a confirmation from the user that is the positive search result is correct.

13. The method as in claim 11 wherein step (E) (3) (e) further comprises the steps of:
   (v) tracking the user's activity in the database system to automatically create a confirmation of the positive search result without user interaction; and
   (vi) storing the confirmation in the respective error memory record.

14. The method as in claim 13 wherein step (E) (2) further comprises the step of:
   (A) recording duration of time the user spends viewing the positive search result.

15. The method as in claim 14 wherein the global computer network system is the Internet and the positive search result is an Internet website.

16. The method as in claim 1 wherein the search string is entered into the database system directly by the user.

17. The method as in claim 1 wherein the search string is audibly communicated to the user and subsequently entered into the database system by the user.

18. The method as in claim 1 wherein the pronounceable unit is at least one letter.

19. The method as in claim 1 wherein step (B) further comprises the steps of:
   (1) converting speech to text using a voice recognition application.

20. The method as in claim 1 further comprising the steps of:
   (F) monitoring at least one new search string entered by the user and further monitoring at least one result associated therewith for a predetermined time period; and
   (G) comparing the at least one new search string entered by the user and the search string previously entered by the user to determine a textual correlation therebetween.

21. A method of directing a user to an Internet Website address, the method comprising the steps of:
   (A) creating a phonetic database having a plurality of phonetically equivalent formulas stored therein, each of the phonetically equivalent formulas being associated with at least one respective pronounceable unit;
   (B) receiving a search string from the user;
   (C) querying a registered URL database with the search string, the registered URL database having a plurality of URL records and at least one respective Internet Website address stored therein;
   (D) if the search string exists in the registered URL database:
      (1) identifying a respective one of the URL records which matches the search string as the Internet Website address; and
      (2) directing the user to the Internet Website address; and
   (E) if the search string does not exist in the registered URL database:
      (1) querying a URL error memory database with the search string, the URL error memory database having a plurality of URL error memory records, each of the URL error memory records having at least one Internet Website address and at least one search string associated therewith;
      (2) if the search string exists in the URL error memory database:
         (a) identifying a respective one of the URL error memory records which matches the search string as the Internet Website address; and
         (b) directing the user to the Internet Website address; and
      (3) if the search string does not exist in the URL error memory database:
         (a) parsing the search string into at least one pronounceable unit;
         (b) applying the phonetically equivalent formulas to the at least one pronounceable unit for outputting at least one phonetic search string;
         (c) comparing the at least one phonetic search string with the URL records and the URL error memory records;
         (d) if the at least one phonetic search string exists in the registered URL database:
            (i) identifying at least one result candidate which matches the at least one phonetic search string as the Internet Website address;
         (e) if the at least one phonetic search string exists in the URL error memory database:
            (i) identifying at least one result candidate which matches the at least one phonetic search string as the Internet Website address; and
         (f) if the Internet Website address is confirmed by the user:
            (i) storing the search string, a confirmed phonetic search string and the Internet website in the URL error memory database as an URL error memory record.

* * * * *